United States Patent [19]
Anderson, Sr.

[11] Patent Number: 5,372,761
[45] Date of Patent: Dec. 13, 1994

[54] METHOD AND DEVICE FOR REPAIRING LAMINATED GLASS

[76] Inventor: Ramon C. Anderson, Sr., 158 S. 100 West, Millville, Utah 84326

[21] Appl. No.: 160,381

[22] Filed: Nov. 30, 1993

[51] Int. Cl.$^5$ .............. B29C 31/04; B29C 43/00; B32B 35/00
[52] U.S. Cl. .................. 264/36; 156/94; 264/102; 264/571; 425/12; 425/13; 427/140
[58] Field of Search .......... 264/36, 102, 31-35, 264/267, 313, 571; 425/11-14; 156/94, 98; 427/140

[56] References Cited

U.S. PATENT DOCUMENTS

| | | | |
|---|---|---|---|
| 3,914,145 | 10/1975 | Forler et al. | 264/36 X |
| 3,988,400 | 10/1976 | Luhman, III | 264/36 |
| 3,993,520 | 11/1976 | Werner et al. | |
| 4,058,234 | 11/1977 | Vrolyk et al. | 264/36 X |
| 4,067,759 | 1/1978 | Vrolyk et al. | 264/36 X |
| 4,132,516 | 1/1979 | Story | 264/36 X |
| 4,200,748 | 4/1980 | Jacino et al. | |
| 4,273,598 | 6/1981 | Bowditch | 264/36 X |
| 4,753,695 | 6/1988 | Alexander et al. | |
| 4,775,305 | 10/1988 | Alexander et al. | 156/94 X |
| 4,826,413 | 5/1989 | Mattes | 264/36 X |
| 4,840,551 | 6/1989 | Lay et al. | |
| 4,851,169 | 7/1989 | Lay et al. | |
| 4,986,862 | 1/1991 | Matsutura | 264/36 X |

Primary Examiner—Karen Aftergut
Attorney, Agent, or Firm—Thompson E. Fehr

[57] ABSTRACT

A device for repairing laminated glass by inserting a liquid, curable resin into the fracture in the glass. An absorbent material is attached to the bottom of a suction cup. When it is desired to commence a repair, several drops of the resin are placed in the absorbent material. The suction cup is then positioned over the fracture such that the absorbent material is aligned with the center of the damage. Then the center of the suction cup is depressed toward the glass until resin flows from the absorbent material. To expedite the repair process, the vacuum between the suction cup and the glass may be intensified by pulling the center of the suction cup farther from the glass without detaching the edge of the suction cup; the center is maintained at this distant location for several seconds before being returned to its original position; and the pulling and returning is repeated several times. This process may be facilitated by attaching a handle to the top of the suction cup. And the cyclical variation of the vacuum may alternatively be achieved by withdrawing and depressing the plunger of a syringe whose nozzle has been inserted in a channel that has been formed to run from the top to the bottom of the suction cup.

13 Claims, 2 Drawing Sheets

METHOD AND DEVICE FOR REPAIRING LAMINATED GLASS

BACKGROUND OF THE INVENTION

1. Field of the Invention

This invention relates to a device and method for repairing damaged laminated glass such as the safety glass utilized for the windshields of motor vehicles.

2. Description of the Related Art

Virtually every driver is familiar with the damage caused to windshields by flying rocks. The resultant fractures in the glass can be classified within four categories: bull's-eye, star, combination (of bull's-eye and star), and radial. The plastic layer inserted between the outer and inner layers of the laminated glass usually assures that any of these fractures are confined to the outer layer of glass. In the bull's-eye break, a cone of glass with its apex at the point of impact separates from the outer layer of glass with its flat end generally remaining attached to the plastic. A star break is composed of multiple cracks, each of which begins at the point of impact and travels outward therefrom. Quite logically, the combination break incorporates the features of both the bull's-eye and the star fractures. And a radial crack is a single crack which passes through the point of impact.

Various inventions have been patented to repair these fractures by replacing the air which has entered the interstices that form the fracture with a liquid resin which bonds to the glass and cures to a solid form with an index of refraction that is near to that of the glass.

All of the inventions incorporate a device for holding resin in the vicinity of the fracture and a structure for attaching this device to the glass. Most have the ability to create a vacuum above the fracture to facilitate the removal of air therefrom and the replacement of the air with resin. And some, which are designed primarily to repair bull's-eye breaks, possess a pointed probe that is used to manipulate the apex of the cone of glass in order to assist the movement of resin into the fracture.

U.S. Pat. No. 3,841,932 of C. Richard Forler and Conrad F. Heins uses pliable, moldable material to form a reservoir on a windshield into which a polymerizable resin is introduced so that it can flow into the highest point of the crack. A pointed probe is then manually used to manipulate the cone of glass. After the resin has hardened, the excess resin is sheared away.

Three inventions utilize an external source to create a vacuum above the fracture.

In U.S. Pat. No. 4,165,397 of P. H. Ogden and H. Pennicott, a vacuum cup is held on the glass by air pressure. Within the vacuum cup a reservoir is adhesively attached to the glass. Through an injectable portion of the vacuum cup, resin is injected into the reservoir while the vacuum is maintained. Then the vacuum cup is removed, and the resin penetrates the fracture and is cured. Subsequently, the reservoir is taken away; and excess resin is scraped from the glass.

A vacuum cup is also held on the glass by air pressure in U.S. Pat. No. 4,047,863 of Douglas McCluskey and Harley E. Kelchner. A vacuum is applied to the glass and subsequently removed. Next, a reservoir is formed on the glass from modeling clay, putty, or the like; the reservoir is filled with a polymerizable liquid; the vacuum cup is reinstalled; a vacuum is cyclically reinstituted; and a pointed probe manipulates the glass cone to facilitate the escape of air from the fracture. Optionally, a sleeve and plunger can be inserted into the polymerizable liquid so that the sleeve surrounds the crack and creates an area where depression of the plunger forces the liquid under pressure into the fracture. The vacuum cup is subsequently removed; the liquid, cured with ultraviolet light; and the excess material, cut away.

Finally, the invention in U.S. Pat. No. 4,280,861 of Herbert S. Schwartz has a vacuum cup which is held on the glass by air pressure. A threaded tube is screwed into the vacuum cup until the open, inner end of the tube touches the glass. The outward end of the tube is covered with a resilient disk. This disk is punctured by the needle of a syringe which injects resin into the tube and can also be used as a pointed probe to manipulate the cone of glass. An external pump and air compressor are connected to a third opening of the tube to create alternating pressure and vacuum within the tube, thereby withdrawing air from the fracture and forcing resin into it. The tube and vacuum cup are then withdrawn, the resin hardens, and excess resin is cut away.

U.S. Pat. No. 3,562,366 of William E. Sohl has two distinct embodiments. Both have in common a device which is attached to the inside of a windshield to create supersonic vibrations that assist resin to fill a fracture in the outer layer of the windshield. The embodiments differ in the structure that is used to apply resin. The first is simply a resilient cup the open end of which can be pressed onto the damaged side of the windshield; after such attachment, the cup is filled with resin through a small aperture. The cup contains either a removable or permanently attached rigid, pointed probe that presses against the cone of glass. The second version consists of a block with a chamber to hold resin that extends to, and, consequently, creates an open end of, the block; a channel leading through the block to the chamber; a syringe which can be removably inserted into the outer end of the channel; and a threaded, pointed probe that can be screwed into a threaded portion of the block, through the chamber, and against the cone of glass. The syringe forces resin into the chamber and thence into the fracture. Either embodiment of the structure for applying resin can be held against the windshield by spring-loaded frames supported from suction caps applied to the damaged outer side of the windshield.

The invention in U.S. Pat. No. 3,765,975 of Gordon P. Hollingsworth is very similar to the second embodiment of U.S. Pat. No. 3,562,366. There is a block containing a chamber to hold resin that reaches, and, therefore, establishes, an open end of the block. The needle of a syringe extends from outside the block into the chamber. The body of the syringe may be removably connected to the needle. The block is also fitted with a threaded, pointed probe which extends into the chamber. To start the repair, the block is most conveniently held on the glass by a supporting frame attached to the windshield with rubber suction cups. To start the repair, the syringe is filled with a liquid polymerizable resin and attached to the needle embedded in the block. Optionally, an initial sequence of negative and positive pressure in the chamber may then be created by retracting and extending the plunger of the syringe. This permits air to escape from the fracture and resin to flow into the chamber. The probe is next forced against the cone of glass until the cone moves. Positive and negative pressure is subsequently applied with the syringe.

The apparatus is then removed; the resin, cured; and excess resin, scraped or filed away.

Two significantly different embodiments are again presented in U.S. Pat. No. 3,993,520 of Frank D. Werner and Robert W. Wiele. In the first, an injector tube having a resilient annular tip and a resilient interior is mechanically pressed, by a support structure attached to the glass with suction cups, against the damaged windshield. Resin is placed into the injector tube and forced, with a plunger that passes along the resilient interior, into the fracture in the windshield. A subsequent slight withdrawal of the plunger creates a vacuum which draws air, through the resin, from the fracture. This cycle of pressure and vacuum can be repeated as desired. The second embodiment comprises placing resin on the windshield; putting a ring of vacuum cup lubricant around the fracture; covering all the preceding with a sheet of polyethylene; placing a suction cup over the polyethylene; depressing the suction cup to force resin into the fracture, although some resin enters the fracture because of surface tension even if the suction cup is not depressed; then creating a vacuum with the suction cup; and finally, releasing the vacuum. The cycle of pressure and vacuum can, again, be repeated as desired.

In U.S. Pat. No. 4,753,695 of George E. Alexander, Von L. Alexander, and Thomas R. Spoo, the invention has an adapter that is adhesively attached to a damaged windshield. The adapter is deformable and removably receives a syringe which has been filled with a liquid polymerizable resin. The syringe can communicate with the fracture through a circular recess which extends through the adapter. It is disclosed, but not claimed, that the plunger of the syringe is first retracted a short distance to evacuate air from the fracture. Then the plunger is depressed to force resin into the fracture. After the resin has polymerized, the syringe, adapter, and any excess resin are removed.

Similarly, the invention in U.S. Pat. No. 4,200,478 of Gerald Jacino and Anthony Jacino utilizes a pedestal which is adhesively attached to a piece of damaged glass. Resin is again placed in a syringe that is then removably mounted on the pedestal, which has a chamber that extends from the syringe to the glass. A valve can connect the interior of the syringe to the atmosphere so that opening the valve before the plunger is depressed, initially to move resin from the syringe to the fracture, and closing it prior to withdrawal of the plunger creates a vacuum which removes air from the fracture and allows resin to flow into it. When, this process has been repeated a number of times, the valve is opened before the plunger is withdrawn and closed before it is again depressed, creating increased pressure to force the resin into the fracture. When the pedestal has been removed and the resin cured, excess resin may be cut away.

U.S. Pat. No. 4,840,551 of Kurt Lay and Erwin Sailer concerns an apparatus for repairing windshields; U.S. Pat. No. 4,851,169 of the same inventors claims a process that utilizes the apparatus from the earlier patent. A suction cup is placed over the damaged portion of a windshield and remains in that position by a vacuum created either with an external pump or through the tendency of the cup to regain its original shape after having been forced downward to the windshield, having expelled the air which was previously between it and the windshield, and having subsequently formed with the glass an impermeable seal around its perimeter, i.e., functioning in the well-known manner of a suction cup. Because the cup is transparent and penetrable with the needle of a syringe filled with resin, the needle can have its tip placed in the center of the fracture, where the resin is ejected from the syringe. The resin then enters the fracture because of capillary forces and the vacuum. No pressure need be exerted on the resin, nor is alternating between a vacuum and increased pressure required.

Of the devices which utilize a vacuum or the cyclical application of pressure and a vacuum, those of U.S. Pat. No. 3,993,520 and U.S. Pat. No. 4,840,551 employing a suction cup appear to be the simplest. Still, considerable skill would seem to be necessary in order to retain the resin by means of the ring of vacuum cup lubricant and the sheet of polyethylene from the former patent; and some practiced dexterity would be required to manipulate the syringe from the latter patent accurately and safely.

SUMMARY OF THE INVENTION

The instant invention utilizes a suction cup to create a vacuum which retains the cup on the damaged glass and facilitates the flow of resin into the fracture. The method for holding the resin in the vicinity of the fracture is, however, considerably simpler than any disclosed in the prior art.

A small piece of absorbent material is attached, preferably adhesively, to the bottom of the suction cup. Preferably the absorbent material is in the shape of a cone or a tetrahedron and has a flat side connected to the bottom of the suction cup with its apex pointing away from the suction cup, although the invention works satisfactorily no matter what the shape of the absorbent material is.

When it is desired to commence the repair, a small quantity of liquid, curable resin—preferably six or seven drops—is placed upon and retained by the absorbent material. The suction cup is then positioned over the fracture such that the absorbent material is aligned with the center of the damage. Next, the center of the cup is depressed toward the glass until resin flows from the absorbent material. After this depressing of the cup, its resilient nature causes it to tend to rise and regain its original shape. This produces a vacuum between the glass and the portion of the cup inward from its edge; the edge is pressed tightly against the glass by the pressure of the atmosphere. The suction cup is thereby retained on the glass, and resin enters the fracture through capillary action and as a replacement for air which has been withdrawn from the crack by the vacuum. To permit maximum depression of the suction cup and create the maximum vacuum, it is preferable to attach the absorbent material to the center of the bottom of the cup, although it is satisfactory to place the absorbent material anywhere on the bottom of the cup that is sufficiently inward from the edge to permit the edge to form the requisite airtight seal with the glass. The adjective "small" has, consistently, been applied to the piece of absorbent material to indicate its size will be adequate to retain the resin but not so large as to interfere with the creation of the vacuum.

The preceding technique works successfully for all four categories of fractures. It is necessary, though, to leave the suction cup in place for three to six hours. However, because a lengthier duration does not degrade the repair, it is often convenient to commence the repair in the evening and allow the suction cup to remain on the glass overnight.

If a more rapid process is desired, for bull's-eye and combination breaks the requisite time can be reduced to as little as five minutes by cyclically varying the strength of the vacuum. This is accomplished by pulling the center of the suction cup away from the glass sufficiently to increase the volume between the suction cup and the glass without detaching the edge of the suction cup from the glass and subsequently returning the center to its prior position. Preferably, this is done three or four times with the center being maintained at its most distant position from the glass for approximately five seconds on each cycle.

The suction cup is merely that which is well known in the art, being composed of flexible resilient material, such as rubber or plastic, capable of forming a vacuum-tight intermediate space between the suction cup and the glass. Preferably, it is transparent to visible light to facilitate the alignment of the absorbent material with the center of the fracture. One example of suitable material for such a suction cup is plasticized polyvinyl chloride.

The absorbent material is preferably an open-celled foamed plastic such as sponge rubber or polyurethane. And when polyurethane is utilized, high-density polyurethane, i.e., polyurethane having small cells, is preferred because adhesive attachment of the polyurethane to the suction cup is most satisfactory with such high-density polyurethane.

The adhesive simply needs to be such that it can successfully attach the absorbent material to the suction cup without damaging either. When polyurethane is to be attached to a plasticized polyvinyl chloride suction cup, a preferred adhesive is Duro Quick Gel No-run Super Glue, which is commercially available from the Loctite Corporation of Cleveland, Ohio.

And the resin can be any of those utilized in the patents discussed above. It is, however, preferably acrylic resin which is cured by exposure to ultraviolet light. Preferably, therefore, the suction cup is manufactured of material which is not only transparent for visible light but, opaque for ultraviolet light. To permit resin that is cured with ultraviolet light to flow adequately into the fracture, it is necessary either that the suction cup be opaque for ultraviolet light or to have the vacuum otherwise maintained in an environment free from ultraviolet radiation—for example, by conducting the operation at night or with a cover that is opaque for ultraviolet light, such as a rag, placed over the suction cup. If a suction cup is utilized which is opaque for visible light and the absorbent material has not been attached in the center of the bottom of the cup, it is preferable to indicate on the top of the suction cup—such as with a dot of paint—the location of the absorbent material.

The simplicity of this device renders it readily usable by the average person. And the active participation by the consumer in the repair process requires no more than five minutes. Such convenience, coupled with the absence of any needle-equipped syringe, permits the driver of a vehicle whose windshield has been damaged to carry a repair device safely in the vehicle and, therefore, to commence any repair promptly—an extremely significant advantage in view of the fact that the National Glass Association has asserted the adhesion of the glass layers to the inner plastic layer of safety glass is degraded if moisture reaches the plastic layer, possibly permitting increased quantities of glass to be liberated from the plastic in the event of a collision.

DESCRIPTION OF THE PREFERRED EMBODIMENT

Figure 1:
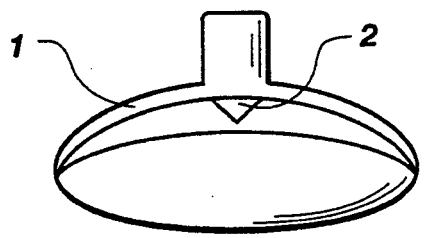
FIG. 1 shows a lateral view of the device for repairing laminated glass.

As can be seen from FIG. 1, the most visually prominent feature of the present invention is a suction cup (1). The suction cup (1) is merely that which is well known in the art, being composed of flexible resilient material, such as rubber or plastic, capable of forming a vacuum-tight intermediate space between the suction cup (1) and the glass which is to be repaired. Preferably, the suction cup (1) is made from plasticized polyvinyl chloride.

Attached, preferably adhesively, to the bottom of the suction cup (1) is a small piece of absorbent material (2), which is preferably high-density polyurethane. To permit maximum depression of the suction cup (1) and create the maximum vacuum, it is preferable to attach the absorbent material (2) to the center of the bottom of the cup (1), although it is satisfactory to place the absorbent material (2) anywhere on the bottom of the cup (1) that is sufficiently inward from the edge to permit the edge to form the requisite airtight seal with the glass. The absorbent material (2) is preferably in the shape of a cone or a tetrahedron with a flat side connected to the bottom of the suction cup (1) and its apex pointing away from the suction cup (1), although the invention works satisfactorily no matter what the shape of the absorbent material is.

The adhesive simply needs to be such that it can successfully attach the absorbent material (2) to the suction cup (1) without damaging either. In the event polyurethane is to be attached to plasticized polyvinyl chloride, a preferred adhesive is Duro Quick Gel No-run Super Glue, which is commercially available from the Loctite Corporation of Cleveland, Ohio.

When it is desired to commence the repair, a small quantity of liquid, curable resin - preferably six or seven drops—is placed upon and retained by the absorbent material (2). The suction cup (1) is then positioned on the glass over the fracture such that the absorbent material (2) is aligned with the center of the damage. To facilitate this alignment, the suction cup (1) is preferably transparent to visible light.

Next, the center of the cup (1) is depressed toward the glass until resin flows from the absorbent material (2). After this depressing of the cup (1), its resilient nature causes it to tend to rise and regain its original shape. This produces a vacuum between the glass and the portion of the cup (1) inward from its edge; the edge is pressed tightly against the glass by the pressure of the atmosphere. The suction cup (1) is thereby retained on the glass, and resin enters the fracture through capillary action and as a replacement for air which has been withdrawn from the crack by the vacuum.

The resin can be any of those utilized in the prior art patents discussed above. It is, however, preferably acrylic resin which is cured by exposure to ultraviolet light. Preferably, therefore, the suction cup (1) is manufactured of material which is not only transparent for visible light but, opaque for ultraviolet light. To permit resin that is cured with ultraviolet light to flow adequately into the fracture, it is necessary either that the suction cup (1) be opaque for ultraviolet light or to have the vacuum otherwise maintained in an environment free from ultraviolet radiation—for example, by conducting the operation at night or with a cover that is opaque for ultraviolet light, such as a rag, placed over the suction cup (1).

The technique explained above works successfully for all four categories of fractures. It is necessary, though, to leave the suction cup (1) in place for three to six hours. However, because a lengthier duration does not degrade the repair, it is often convenient to commence the repair in the evening and allow the suction cup (1) to remain on the glass overnight.

If a more rapid process is desired, for bull's-eye and combination breaks the requisite time can be reduced to as few as five minutes by cyclically varying the strength of the vacuum. This is accomplished by pulling the center of the suction cup (1) away from the glass sufficiently to increase the volume between the suction cup (1) and the glass without detaching the edge of the suction cup (1) from the glass and subsequently returning the center to its prior position. Preferably, this is done three or four times with the center being maintained at its most distant position from the glass for approximately five seconds on each cycle.

Figure 2:
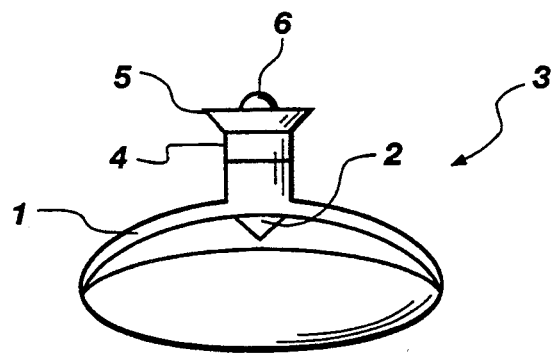
FIG. 2 presents a lateral view of an alternate embodiment which has added to the embodiment of FIG. 2 a handle at the top of the suction cup.

To increase the convenience of this cyclical process, a handle (3) is attached to the top of the suction cup (1) as shown on the alternate embodiment depicted in FIG. 2. Because of its inexpensive construction, the handle (3) is preferably composed of a spacer (4) placed immediately atop the suction cup, a faucet washer (5) on the spacer with its flat side opposite to the spacer, and a screw (6) passing through the faucet washer (5) and spacer (4) into the top of the suction cup (1) but not penetrating the bottom of the suction cup (1) so that the ability of the suction cup (1) to maintain a vacuum will not be impaired.

Figure 3:
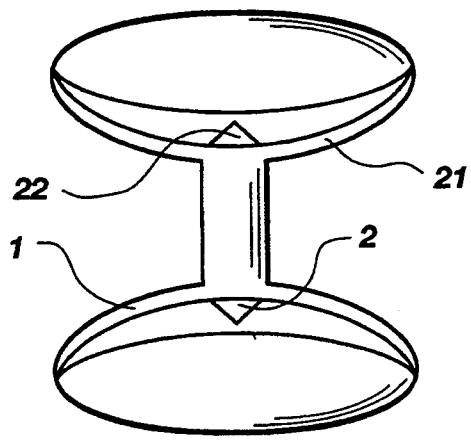
FIG. 3 depicts a double-ended suction cup where resin may be placed in the absorbent material of one cup while a cleaning and drying solvent may be put in the absorbent material of the other cup and where one cup can be used as a handle while the other cup is being utilized to apply the contents of its absorbent material to a fracture in the glass.

An alternate type of handle is created, as depicted in FIG. 3, by having a double-ended device so that at one end there is a suction cup (1) with absorbent material (2) attached to the bottom of the suction cup (1) and at the other end there is a second suction cup (21) with a second piece of absorbent material (22) that is attached to the bottom of the second suction cup (21). This is particularly desirable because it is often prudent initially to clean the fracture and to remove water therefrom by applying to the fracture a suitable volatile solvent, such as ethyl alcohol, methyl alcohol, acetone, or methyethyl ketone. The solvent can be placed in the absorbent material (2) or (22) of one suction cup (1) or (21) and applied to the fracture using the other suction cup (21) or (1) as a handle. Then the resin can be placed in the absorbent material (22) or (2) of the second suction cup (21) or (1) and applied to the fracture utilizing the first suction cup (1) or (21) as a handle.

Figure 4:
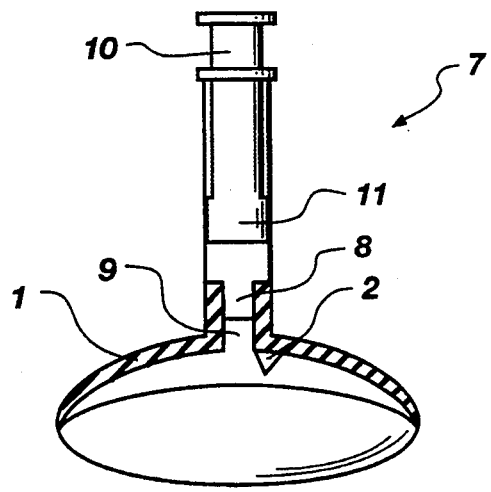
FIG. 4 displays a second alternate embodiment that has supplemented the structure in the embodiment of FIG. 1 with a syringe attached to the top of the suction cup.

In a second optional embodiment, i.e., a third embodiment, which is illustrated in FIG. 4, a syringe (7) having no needle attached to its nozzle (8) is connected to the suction cup (1) by having its nozzle (8) pushed into a channel (9) that has been formed in the suction cup (1)—for example, by drilling or by the initial molding process that shaped the suction cup (1)—and runs from the top to the bottom of the suction cup (1). The diameter of the channel (9) is selected so that the nozzle (8) will be frictionally, but removably, retained within the channel (9) and so that the suction cup (1) will establish an airtight seal with the outer side of the nozzle (8). In this embodiment, the preferable location for the absorbent material (2) is on the bottom of the suction cup (1) just to the side of the channel (9) so that the possibility of resin being drawn into the channel (9) will be minimized, although the embodiment will function satisfactorily even if the suction cup (1) is so small that the absorbent material (2) must be placed across the channel (9) in the bottom of the suction cup (1) to preclude the absorbent material (2) from interfering with the formation of an airtight seal between the glass and the edge of the suction cup (9).

Placing and depressing the attached suction cup (1) of this third embodiment on the damaged glass after the plunger (10) has been depressed will permit a more intense vacuum to be created by the subsequent partial withdrawal of the plunger (10) because the total quantity of air remaining between the glass and the suction cup (1) will be the same whether the embodiment utilized has a syringe (7) or not, but the volume to be occupied by this air will be significantly larger for the embodiment employing the syringe (7) after the plunger (10) has been partially withdrawn, thereby pulling the piston (11) farther into the syringe (7). If the plunger (10) were not initially completely depressed, the volume would be greater than when no syringe (7) is attached to the suction cup (1); but the volume would still be increased, when the plunger (10) is withdrawn above the position it occupied in the syringe (7) when the suction cup (1) was depressed. Of course, this technique would not work if the plunger (10) were completely withdrawn from the syringe (7) because the vacuum would thereby be lost.

If desired, the cyclical process for varying the intensity of the vacuum may be utilized with this embodiment merely by repetitively partially withdrawing and subsequently depressing the plunger (10).

And with the embodiment incorporating the syringe (7), a variation of the cyclical process may be invoked. If the plunger (10) is withdrawn to some extent before the attached suction cup (1) is placed on the damaged glass and depressed, the subsequent depressing of the plunger (10) will create increased pressure above the damaged glass to force resin from the absorbent material (2) into the fracture. The cyclical process may then be performed as described above.

Figure 5:
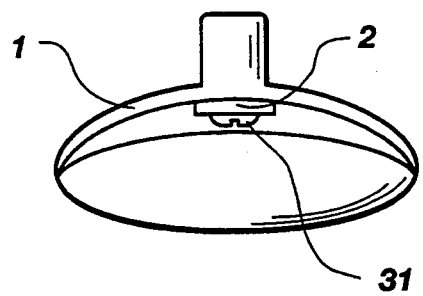
FIG. 5 portrays an embodiment where a retainer, such as a tack or screw, is used to attach the absorbent material to the suction cup and to prevent excessive depression of the suction cup.
Figure 6:
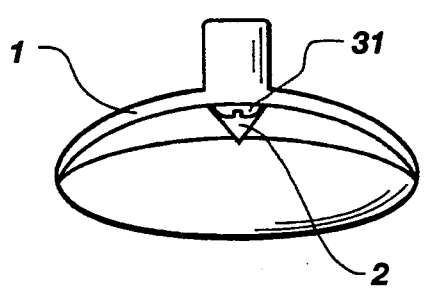
FIG. 6 illustrates an embodiment where the retainer is first inserted into the bottom of the suction cup and then has the absorbent material attached to it.

Should the suction cup (1) be depressed excessively, the device will still function satisfactorily. Excessive depression may, however, be prevented by placing a retainer, such as a screw or tack, (31) in the bottom of the suction cup (1). The retainer (31) may be used to attach the absorbent material (2) to the suction cup (1) as portrayed in FIG. 5 or may be inserted into the bottom of the suction cup (1) and then have the absorbent material (2) attached to it as illustrated in FIG. 6.

I claim:

1. A device for repairing damaged laminated glass, which comprises:
   a suction cup to be placed over the damaged glass; and
   a small piece of absorbent material attached to a bottom of the suction cup for receiving and retaining a curable resin within the suction cup until the absorbent material is pushed against the damaged glass when the suction cup is depressed and tends to return to its undepressed shape to create a vacuum over a fracture in the damaged glass causing release of the curable resin into the fracture by capillary action for repair of the damaged glass.

2. The device for repairing damaged laminated glass as recited in claim 1, wherein:
   the suction cup is composed of plasticized polyvinyl chloride.

3. The device for repairing damaged laminated glass as recited in claim 2, wherein:
   the absorbent material is polyurethane.

4. The device for repairing damaged laminated glass as recited in claim 1, further comprising:
   a handle attached to a top of the suction cup.

5. The device for repairing damaged laminated glass as recited in claim 4, wherein:
   the suction cup is composed of plasticized polyvinyl chloride.

6. The device for repairing damaged laminated glass as recited in claim 5, wherein:
   the absorbent material is polyurethane.

7. A device for repairing damaged laminated glass, which comprises:
   a suction cup to be placed on the damaged glass, which suction cup has a channel running from its top to its bottom;
   a small piece of absorbent material attached to the bottom of the suction cup for receiving and retaining a curable resin within the suction cup until the absorbent material is pushed against the damaged glass when the suction cup is depressed and tends to return to its undepressed shape to create a vacuum over a fracture in the damaged glass causing release of the curable resin into the fracture by capillary action for repair of the damaged glass; and
   a syringe having no needle attached to its nozzle, which nozzle is pushed into the channel of the suction cup and diameters of which nozzle and channel are relatively sized such that the nozzle is frictionally, but removably, retained within the channel and such that the suction cup establishes an airtight seal with an outer side of the nozzle, permitting the vacuum to be intensified by withdrawing a plunger in the syringe above its position in the syringe when the suction cup is placed on the damaged glass and depressed and allowing pressure over the damaged glass to be increased, thereby forcing the resin from the absorbent material into the fracture, by depressing the plunger in the syringe beyond its position in the syringe when the suction cup is placed on the damaged glass and depressed.

8. The device for repairing damaged laminated glass as recited in claim 7, wherein:
   the suction cup is composed of plasticized polyvinyl chloride.

9. The device for repairing damaged laminated glass as recited in claim 8, wherein:
   the absorbent material is polyurethane.

10. A process for repairing damaged laminated glass, which comprises:
    placing a small quantity of liquid, curable resin into a small piece of absorbent material attached to a bottom of a suction cup;
    then positioning the suction cup on the damaged glass over a fracture such that the absorbent material is aligned with a center of the fracture; and
    then depressing a center of the suction cup toward the damaged glass until resin flows from the absorbent material, and allowing the suction cup to tend to regain its undepressed shape thereby creating a vacuum between the suction cup and the damaged glass to remove air from the fracture and cause the resin to flow from the absorbent material into the fracture by capillary action for repair of the damaged glass.

11. The process for repairing damaged laminated glass as recited in claim 10, further comprising:
    after having depressed the center of the suction cup to create a vacuum, pulling the center of the suction cup away from the damaged glass sufficiently to increase a volume between the suction cup and the damaged glass without detaching an edge of the suction cup from the damaged glass in order to create a more intense vacuum;
    subsequently returning the center to its prior position; and
    repeating the steps of pulling the center of the suction cup away from the damaged glass and subsequently returning the center to its prior position.

12. The process for repairing damaged laminated glass as recited in claim 10, further comprising:
    withdrawing a plunger of a syringe, a nozzle of which syringe has been inserted into a channel running from a top to the bottom of the suction cup so that the nozzle is frictionally retained therein with sufficient force to create an airtight seal between the suction cup and the nozzle, above a position that the plunger occupied in the syringe when the suction cup was depressed;
    then depressing the plunger of the syringe; and
    repeating the steps of withdrawing and subsequently depressing the plunger of the syringe during the repairing of the damaged glass.

13. The process for repairing damaged laminated glass as recited in claim 10, further comprising:
    depressing a plunger of a syringe, a nozzle of which syringe has been inserted into a channel running from a top to the bottom of the suction cup so that the nozzle is frictionally retained therein with sufficient force to create an airtight seal between the suction cup and the nozzle, beyond a position that the plunger occupied in the syringe when the suction cup was depressed to force the resin from the absorbent material into the fracture;
    then partially withdrawing the plunger of the syringe; subsequently depressing the plunger of the syringe; and
    repeating the steps of withdrawing and subsequently depressing the plunger of the syringe during the repairing of the damaged glass.

* * * * *